(12) United States Patent
Gray

(10) Patent No.: US 10,647,042 B2
(45) Date of Patent: May 12, 2020

(54) ARTICULATED MOLDING INSERT

(71) Applicant: The Boeing Company, Chicago, IL (US)

(72) Inventor: Everette D. Gray, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 424 days.

(21) Appl. No.: 15/352,262

(22) Filed: Nov. 15, 2016

(65) Prior Publication Data

US 2018/0133924 A1    May 17, 2018

(51) Int. Cl.

| | |
|---|---|
| *B28B 7/18* | (2006.01) |
| *B29C 45/26* | (2006.01) |
| *B29C 33/12* | (2006.01) |
| *B29C 33/44* | (2006.01) |
| *B29C 33/20* | (2006.01) |
| *B29C 45/37* | (2006.01) |
| *B28B 7/28* | (2006.01) |
| *B29C 33/30* | (2006.01) |
| *B28B 7/00* | (2006.01) |
| *B29C 45/33* | (2006.01) |
| *B28B 7/30* | (2006.01) |
| *B29C 45/17* | (2006.01) |
| *B29C 45/36* | (2006.01) |

(Continued)

(52) U.S. Cl.
CPC ........ *B29C 45/2628* (2013.01); *B28B 7/0038* (2013.01); *B28B 7/183* (2013.01); *B28B 7/285* (2013.01); *B29C 33/12* (2013.01); *B29C 33/20* (2013.01); *B29C 33/306* (2013.01); *B29C 33/44* (2013.01); *B29C 45/2602* (2013.01); *B29C 45/2675* (2013.01); *B29C 45/376* (2013.01); *B28B 7/30* (2013.01); *B28B 7/303* (2013.01); *B29C 33/76* (2013.01); *B29C 45/1635* (2013.01); *B29C 45/33* (2013.01); *B29C 45/332* (2013.01); *B29C 2045/1745* (2013.01); *B29C 2045/338* (2013.01); *B29C 2045/363* (2013.01)

(58) Field of Classification Search
CPC ......... B29C 33/76; B29C 33/44; B29C 33/20; B29C 33/306; B29C 45/33; B29C 45/332; B29C 45/2628; B29C 45/2675; B29C 45/1635; B29C 45/376; B29C 2045/338; B29C 2045/363; B29C 2045/1745; B28B 7/30; B28B 7/303
USPC ........................................................ 264/313
See application file for complete search history.

(56) References Cited

U.S. PATENT DOCUMENTS

| | | |
|---|---|---|
| 3,020,594 A | 2/1962 | Makowski |
| 4,289,724 A * | 9/1981 | Baynard ................. B28B 7/007 108/150 |
| 5,015,426 A | 5/1991 | Maus et al. |

(Continued)

FOREIGN PATENT DOCUMENTS

WO    2009044142 A1    4/2009

*Primary Examiner* — Joseph S Del Sole
*Assistant Examiner* — Lawrence D. Hohenbrink, Jr.
(74) *Attorney, Agent, or Firm* — Yee & Associates, P.C.

(57) ABSTRACT

A method and apparatus for forming a part having a cavity with a complex contour is presented. The molding apparatus comprises a mold cavity and a molding insert. The mold cavity is formed by a first mold portion and a second mold portion. The molding insert is within the mold cavity, wherein the molding insert has a forming surface, and wherein the molding insert is configured to move in more than one direction relative to the first mold portion.

20 Claims, 13 Drawing Sheets

(51) Int. Cl.
*B29C 45/16* (2006.01)
*B29C 33/76* (2006.01)

(56) References Cited

U.S. PATENT DOCUMENTS

| | | | |
|---|---|---|---|
| 5,858,286 A | 1/1999 | Brown et al. | |
| 2005/0098295 A1* | 5/2005 | Dubay | B22D 17/24 |
| | | | 164/312 |
| 2014/0010911 A1* | 1/2014 | Rushing, Sr. | B29C 45/332 |
| | | | 425/556 |

* cited by examiner

ARTICULATED MOLDING INSERT

BACKGROUND INFORMATION

1. Field

The present disclosure relates generally to molding material, and more specifically, to forming a part having a cavity with a complex contour. Yet more specifically, the present disclosure includes a molding insert connected to a shaft by an articulating joint.

2. Background

Molding is a manufacturing process using malleable raw material. To mold a part, the raw material is introduced into a mold cavity. The raw material moves into the mold to contact the walls of the mold cavity. The shape of the mold cavity forms an exterior shape for the part.

The mold cavity is created by a plurality of mold portions. To remove the part from the mold cavity, the mold portions are moved away from each other to open the mold.

Molding inserts may be added in the mold cavity to form details in the part. Molding inserts may be used to form surface structures, channels, cavities, or other features. The molding inserts are secured to the mold portions, such that moving the mold portions also moves the inserts.

However, some features may not be formed using a mold and molding inserts. For example, some features may have insufficient draft to remove the molding inserts in a linear direction. Additionally, some cavities with complex contours may trap molding inserts. Therefore, it would be desirable to have a method and apparatus that takes into account at least some of the issues discussed above, such as forming parts with cavities with complex contours, as well as other possible issues.

SUMMARY

In one illustrative example, an apparatus is presented. The apparatus comprises a molding insert and a shaft. The molding insert has a forming surface. The shaft is connected to the molding insert by an articulating joint.

In another illustrative example, a molding apparatus for forming a part having a cavity with a complex contour is presented. The molding apparatus comprises a mold cavity and a molding insert. The mold cavity is formed by a first mold portion and a second mold portion. The molding insert is within the mold cavity, wherein the molding insert has a forming surface, and wherein the molding insert is configured to move in more than one direction relative to the first mold portion.

In yet another illustrative example, a method is presented. A shaft is agitated, wherein the shaft is connected to a molding insert by an articulating joint, and wherein the molding insert has a forming surface. The forming surface of the molding insert is pulled from a formed part while agitating the shaft.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

DETAILED DESCRIPTION

The different illustrative examples recognize and take into account one or more different considerations. For example, the illustrative examples recognize and take into account that high pressure injection and compression molded composite parts have geometry limitations due to current tooling capabilities.

The illustrative examples recognize and take into account that it would be desirable to solve the problem of tooling and automation for tooling of complex contoured molded parts. The illustrative examples recognize and take into account that existing solutions include either costly wash away tooling inserts or multi-piece nested tooling inserts that use manual dismantling after the part molding process. Multi piece nested tooling inserts may also limit the acceptable geometry for the part forming process.

The illustrative examples recognize and take into account that automated processing of previously hand made parts may reduce at least one of processing time or processing costs. The illustrative examples also recognize and take into account that a separable tool that allows for compliant removal around complex contour geometry may enable automated processing of previously hand made parts.

Figure 1:
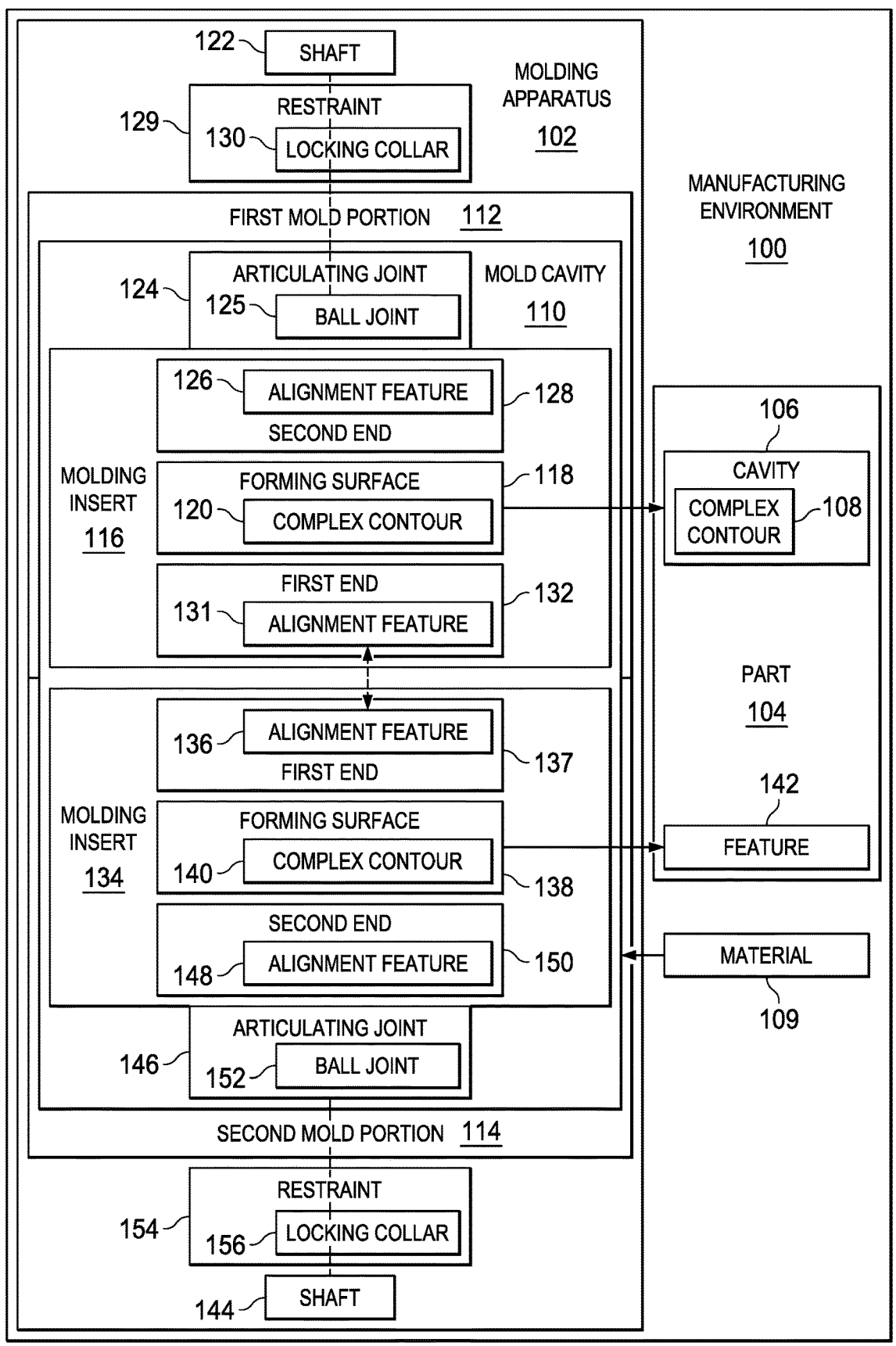
FIG. 1 is an illustration of a block diagram of a manufacturing environment in accordance with an illustrative example.

With reference now to the figures, and in particular, with reference to FIG. 1, an illustration of a block diagram of a manufacturing environment is depicted in accordance with an illustrative example. Manufacturing environment 100 includes molding apparatus 102 for forming part 104 having cavity 106 with complex contour 108. As used herein, a complex contour is considered to be a surface having more than one geometric curvature extending in multiple dimensions. More specifically, complex contour 108 has a first contour on a first edge and a second contour on a second edge. By having complex contour 108, a tool cannot be extracted from cavity 106 in a straight direction.

Part 104 is formed by introducing material 109 into molding apparatus 102. Material 109 may be any desirable material that may be shaped using a molding process. For example, material 109 may be reinforced or unreinforced thermoplastics, reinforced or unreinforced thermoset plastics, reinforced or unreinforced ceramic compounds, or any other desirable material that may be shaped using a molding process.

Molding apparatus 102 comprises mold cavity 110 formed by first mold portion 112 and second mold portion 114 and molding insert 116 within mold cavity 110. Molding insert 116 has forming surface 118. Forming surface 118 is the portion of molding insert 116 that contacts material 109. Molding insert 116 is configured to move in more than one direction relative to first mold portion 112.

As depicted, forming surface 118 has complex contour 120. Complex contour 120 has a first contour on a first edge and a second contour on a second edge. Complex contour 108 in part 104 is formed by flowing material 109 around complex contour 120 of forming surface 118. Thus, complex contour 120 is complementary to complex contour 108. When a surface is complementary to another surface, the surfaces may be mirror images of each other.

Molding insert 116 is connected to shaft 122 by articulating joint 124. Molding insert 116 may also be referred to as an articulated molding insert. In some illustrative examples, articulating joint 124 enables a quick exchange, such as replacement or removal, of molding insert 116. In some illustrative examples, shaft 122 and the remainder of articulating joint 124 may be fabricated as separate components. For example, ball joint 125 may include shaft 122 connected to a ball via threads. Thus, articulating joint 124 may be disassembled to exchange molding insert 116.

In other illustrative examples, molding insert 116 may be removable via a recess or a keyway in molding insert 116. In these examples, components of articulating joint 124 may be removed from molding insert 116 via the recess or keyway to provide a quick exchange of molding insert 116.

Shaft 122 is configured to pull molding insert 116 towards first mold portion 112. Shaft 122 extends through first mold portion 112.

Molding insert 116 is configured to move in at least one direction in response to agitation applied to at least one of first mold portion 112 or second mold portion 114. More specifically, articulating joint 124 enables molding insert 116 to move in at least one direction in response to agitation applied to first mold portion 112. Yet more specifically, articulating joint 124 enables molding insert 116 to move in at least one direction relative to first mold portion 112 in response to agitation applied to first mold portion 112.

As used herein, the phrase "at least one of," when used with a list of items, means different combinations of one or more of the listed items may be used, and only one of each item in the list may be needed. In other words, "at least one of" means any combination of items or number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; or other suitable combinations.

Agitation may be applied to first mold portion 112 by shaking first mold portion 112. Shaking first mold portion 112 may loosen part 104 from first mold portion 112. Shaking first mold portion 112 may ease the removal of part 104 from first mold portion 112.

In some illustrative examples, agitation may be applied separately to shaft 122. When agitation is applied separately to shaft 122, molding insert 116 moves in at least one direction relative to first mold portion 112.

The quantity of directions that molding insert 116 may move relative to first mold portion 112 is affected by the type of joint selected for articulating joint 124. Articulating joint 124 allows molding insert 116 to move in at least one direction relative to shaft 122. Some types of joints for articulating joint 124, allows molding insert 116 to move in more than one direction relative to shaft 122.

For example, articulating joint 124 may be a hinge. When articulating joint 124 is a hinge, molding insert 116 may only move along one plane relative to shaft 122. In another example, articulating joint 124 takes the form of ball joint 125. Ball joint 125 provides a range of movement for molding insert 116 in all directions relative to shaft 122. Articulating joint 124 may be any desirable form or type of joint.

Molding insert 116 has alignment feature 126 configured to align molding insert 116 within mold cavity 110. Alignment feature 126 places molding insert 116 into a desirable position within mold cavity 110 for forming part 104. Alignment feature 126 is also configured to restrain molding insert 116 within mold cavity 110 during shaping operations. Alignment feature 126 is associated with second end 128 of molding insert 116. Alignment feature 126 interacts with first mold portion 112 to restrain molding insert 116 relative to first mold portion 112.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Restraint 129 is associated with shaft 122. First mold portion 112 is positioned between restraint 129 and molding insert 116. Restraint 129 may be activated prior to introducing material 109 to molding apparatus 102. Restraint 129 is released in order to remove part 104 from molding apparatus 102. Restraint 129 holds molding insert 116 still relative to first mold portion 112 while molding insert 116 is in an aligned position. More specifically, restraint 129 holds molding insert 116 still relative to first mold portion 112 prior to introducing material 109 into molding apparatus 102 and as material 109 is introduced to molding apparatus 102. In some illustrative examples, restraint 129 may take the form of locking collar 130. In other illustrative examples, restraint 129 may take the form of any other desirable type of restraining mechanism. For example, restraint 129 may be a latch.

Molding insert 116 has alignment feature 131 configured to restrain molding insert 116 within mold cavity 110 during shaping operations. Alignment feature 131 is associated with first end 132 of molding insert 116. Alignment feature 131 interacts with one of second mold portion 114 or molding insert 134.

In some illustrative examples, molding insert 134 is present within molding apparatus 102. Molding insert 134 is associated with second mold portion 114. In these examples, alignment feature 131 of molding insert 116 interacts with alignment feature 136 of molding insert 134 to restrain molding insert 116 relative to molding insert 134.

Alignment feature 136 is associated with first end 137 of molding insert 134. Alignment feature 136 may take any desirable form. Alignment feature 136 may be magnetic, mechanical, or any other desirable type of feature.

When alignment feature 136 is mechanical, at least one of alignment feature 131 or alignment feature 136 is "male", while at least one of alignment feature 131 or alignment feature 136 is "female". For example, alignment feature 131 may be a tab, while alignment feature 136 is a groove. As another example, alignment feature 131 may be a hole, while alignment feature 136 is a cone. As yet a further example, alignment feature 131 may be a series of ridges, while alignment feature 136 is a complementary series of ridges.

When alignment feature 131 and alignment feature 136 are magnetic, alignment feature 131 and alignment feature 136 may be magnetically attracted to each other. Alignment feature 131 and alignment feature 136 may be magnetic, in addition to or independent of, a mechanical feature.

In other illustrative examples, molding insert 134 may not be present within molding apparatus 102. In these examples, alignment feature 131 of molding insert 116 interacts with second mold portion 114 to restrain molding insert 116 relative to second mold portion 114.

Molding insert 134 has forming surface 138. Forming surface 138 is the portion of molding insert 134 that contacts material 109.

In some illustrative examples in which molding insert 134 is present, molding insert 134 may be a conventional molding insert associated with second mold portion 114. When molding insert 134 is a conventional molding insert, molding insert 134 has forming surface 138 that can be removed from part 104 in a straight pull direction with second mold portion 114. In these examples, forming surface 138 does not have complex contour 140. In these examples, feature 142 of part 104 formed by molding insert 134 does not have a complex contour that would trap molding insert 134.

In other illustrative examples, molding insert 134 is configured to move in more than one direction relative to second mold portion 114. In these illustrative examples, molding insert 134 is connected to shaft 144 by articulating joint 146. Shaft 144 is configured to pull molding insert 134 towards second mold portion 114. Shaft 144 extends through second mold portion 114.

Molding insert 134 is configured to move in at least one direction in response to agitation applied to at least one of first mold portion 112 or second mold portion 114. More specifically, articulating joint 146 enables molding insert 134 to move in at least one direction in response to agitation applied to second mold portion 114. Yet more specifically, articulating joint 146 enables molding insert 134 to move in at least one direction relative to second mold portion 114 in response to agitation applied to second mold portion 114.

Agitation may be applied to second mold portion 114 by shaking second mold portion 114. Shaking second mold portion 114 may loosen part 104 from second mold portion 114. Shaking second mold portion 114 may ease the removal of part 104 from second mold portion 114.

In some illustrative examples, agitation may be applied separately to shaft 144. When agitation is applied separately to shaft 144, molding insert 134 moves in at least one direction relative to second mold portion 114.

The quantity of directions that molding insert 134 may move relative to second mold portion 114 is affected by the type of joint selected for articulating joint 146. Articulating joint 146 allows molding insert 134 to move in at least one direction relative to shaft 144. Some types of joints for articulating joint 146, allow molding insert 134 to move in more than one direction relative to shaft 144.

For example, articulating joint 146 may be a hinge. When articulating joint 146 is a hinge, molding insert 134 may only move along one plane relative to shaft 144. In another example, articulating joint 146 takes the form of ball joint 152. Ball joint 152 provides a range of movement for molding insert 134 in all directions relative to shaft 144. Articulating joint 146 may be of any desirable form or type of joint.

Molding insert 134 has alignment feature 148 configured to align molding insert 134 within mold cavity 110. Alignment feature 148 places molding insert 134 into a desirable position within mold cavity 110 for forming part 104. Alignment feature 148 is also configured to restrain molding insert 134 within mold cavity 110 during shaping operations. Alignment feature 148 is associated with second end 150 of molding insert 134. Alignment feature 148 interacts with second mold portion 114 to restrain molding insert 134 relative to second mold portion 114.

Restraint 154 is associated with shaft 144. Second mold portion 114 is positioned between restraint 154 and molding insert 134. Restraint 154 may be activated prior to introducing material 109 to molding apparatus 102. Restraint 154 is released in order to remove part 104 from molding apparatus 102. Restraint 154 holds molding insert 134 still relative to second mold portion 114, while molding insert 134 is in an aligned position. More specifically, restraint 154 holds molding insert 134 still relative to second mold portion 114 prior to introducing material 109 into molding apparatus 102 and as material 109 is introduced to molding apparatus 102. In some illustrative examples, restraint 154 may take the form of locking collar 156. In other illustrative examples, restraint 154 may take the form of any other desirable type of restraining mechanism. For example, restraint 154 may be a latch.

The illustration of molding apparatus 102 in FIG. 1 is not meant to imply physical or architectural limitations to the manner in which an illustrative example may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative example.

For example, although molding insert 134 is depicted as being associated with feature 142, molding insert 134 may instead be associated with cavity 106. In this example, both molding insert 116 and molding insert 134 are used to form cavity 106. In this example, complex contour 108 is complementary to both complex contour 120 and complex contour 140.

As another example, although molding apparatus 102 is depicted as having molding insert 116 and molding insert 134, molding apparatus 102 may have any desirable number of molding inserts. For example, molding apparatus 102 may include only molding insert 116. As another example, molding apparatus 102 may have more than two molding inserts. For example, molding apparatus 102 may have between three and six molding inserts.

Further, the molding inserts of molding apparatus 102 may include any desirable number of articulating molding inserts. In some examples, all of the molding inserts in molding apparatus 102 are articulating molding inserts. In other examples, only a portion of molding inserts in molding apparatus 102 are articulating molding inserts. For example, only the molding inserts associated with features having complex contours may be articulating. In other illustrative examples, articulating molding inserts may be associated with features that do not have complex contours.

Figure 2:
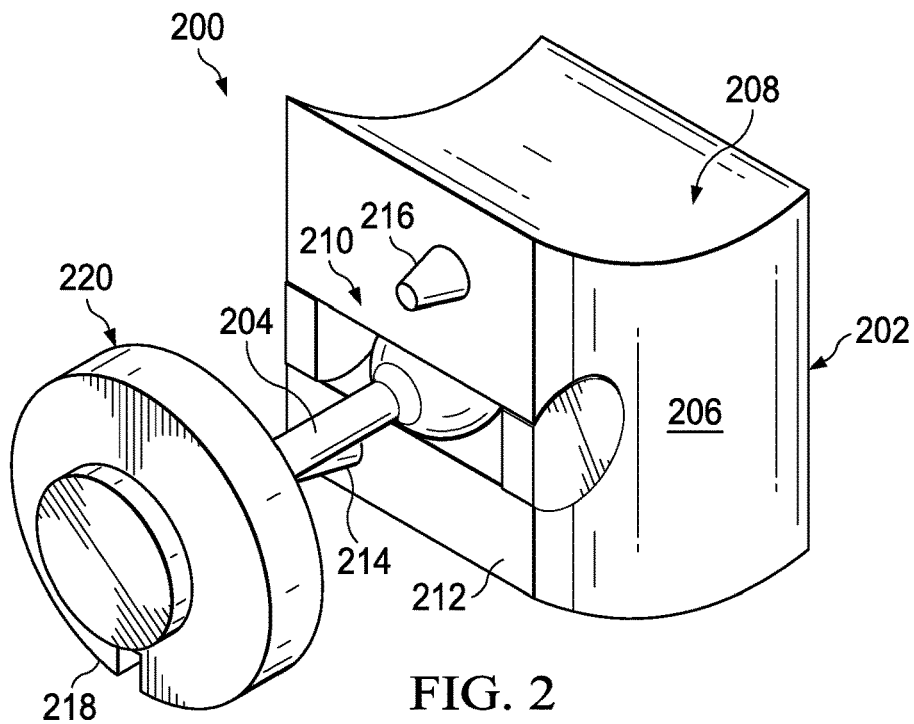
FIG. 2 is an illustration of an isometric view of an articulating molding insert in accordance with an illustrative example.

Turning now to FIG. 2, an illustration of an isometric view of an articulating molding insert is depicted in accordance with an illustrative example. Apparatus 200 comprises molding insert 202 and shaft 204. Molding insert 202 may be a physical implementation of molding insert 116 of FIG. 1. Shaft 204 may be a physical implementation of shaft 122 of FIG. 1.

Molding insert 202 has forming surface 206. Forming surface 206 is a portion of molding insert 202 that forms portions of a part. Forming surface 206 contacts the material used to form the part. The material is shaped or formed using forming surface 206 of molding insert 202. As depicted, forming surface 206 includes a plurality of faces and edges. As depicted, forming surface 206 has complex contour 208. Complex contour 208 is more than one curved surface.

Shaft 204 is connected to molding insert 202 by articulating joint 210. Articulating joint 210 is associated with second end 212 of molding insert 202. Articulating joint 210 may take any desirable form. By selecting a type of joint for articulating joint 210, a number of directions of movement for articulating joint 210 is selected. As used herein, "a number of," when used with reference to items, means one or more items. Thus, a number of directions means one or more directions.

Molding insert 202 has alignment feature 214 associated with second end 212. Molding insert 202 also has alignment feature 216 associated with second end 212. Alignment feature 214 and alignment feature 216 are cones in this example. Alignment feature 214 and alignment feature 216 are "male" mechanical components. Alignment feature 214 and alignment feature 216 interface with "female" mechanical components of a mold portion, such as first mold portion 112 of FIG. 1. Alignment feature 214 and alignment feature 216 are used to align molding insert 202 relative to a mold portion, such as first mold portion 112 of FIG. 1, prior to forming a part.

As depicted, apparatus 200 also includes restraint 218 associated with shaft 204. After aligning molding insert 202 using alignment feature 214 and alignment feature 216, restraint 218 locks molding insert 202 into the aligned position. In this illustrative example, restraint 218 takes the form of locking collar 220. Restraint 218 may be a physical implementation of restraint 129 of FIG. 1.

Figure 3:
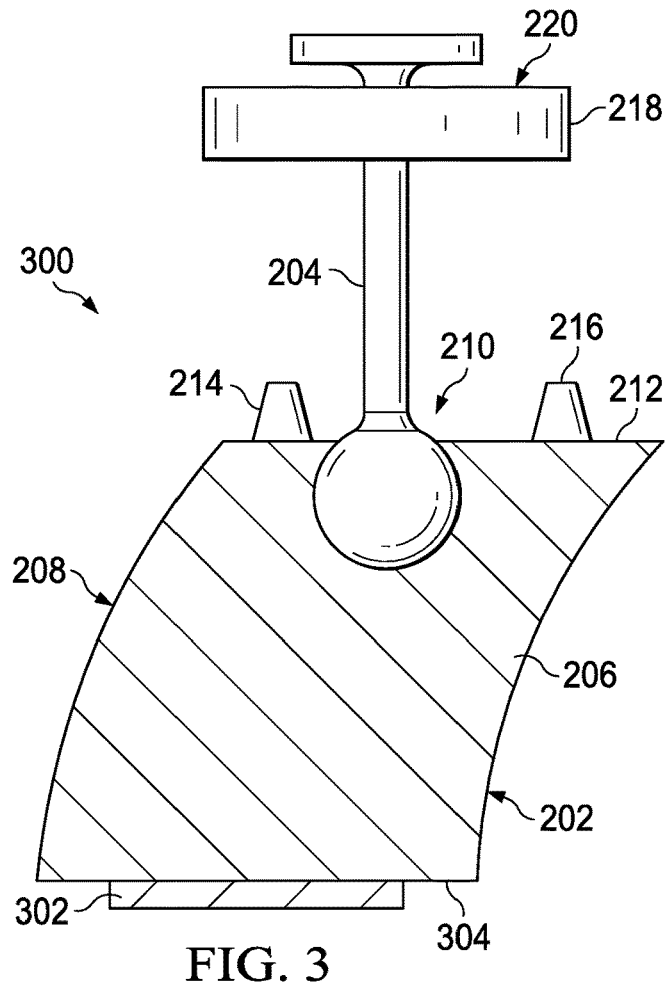
FIG. 3 is an illustration of a cross-sectional view of an articulating molding insert in accordance with an illustrative example.

Turning now to FIG. 3, an illustration of a cross-sectional view of an articulating molding insert is depicted in accordance with an illustrative example. View 300 is a cross-sectional view of apparatus 200 in FIG. 2. As can be seen in view 300, articulating joint 210 is a ball joint.

Further, alignment feature 302 is visible in view 300. Alignment feature 302 is associated with first end 304 of molding insert 202. Alignment feature 302 aligns molding insert 202 with at least one of a mold portion or another molding insert. For example, alignment feature 302 may align molding insert 202 with molding insert 134 of FIG. 1. In another example, alignment feature 302 may align molding insert 202 relative to second mold portion 114 of FIG. 1.

Figure 4:
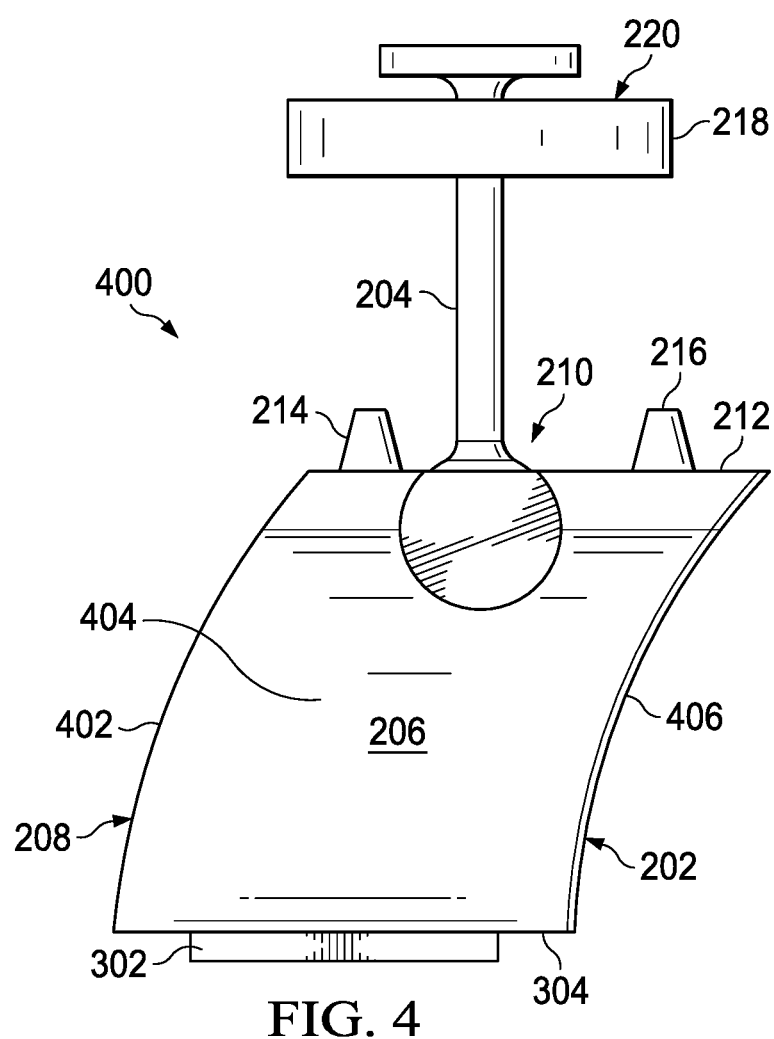
FIG. 4 is an illustration of a side view of an articulating molding insert in accordance with an illustrative example.

Turning now to FIG. 4, an illustration of a side view of an articulating molding insert is depicted in accordance with an illustrative example. View 400 is a side view of apparatus 200 in FIG. 2. Complex contour 208 is more clearly visible in view 400. More specifically, face 402, face 404, and face 406 each have a curvature. The curvatures of face 402, face 404, and face 406 prevent straight removal of molding insert 202 of apparatus 200 in FIG. 2, from a cavity.

Figure 5:
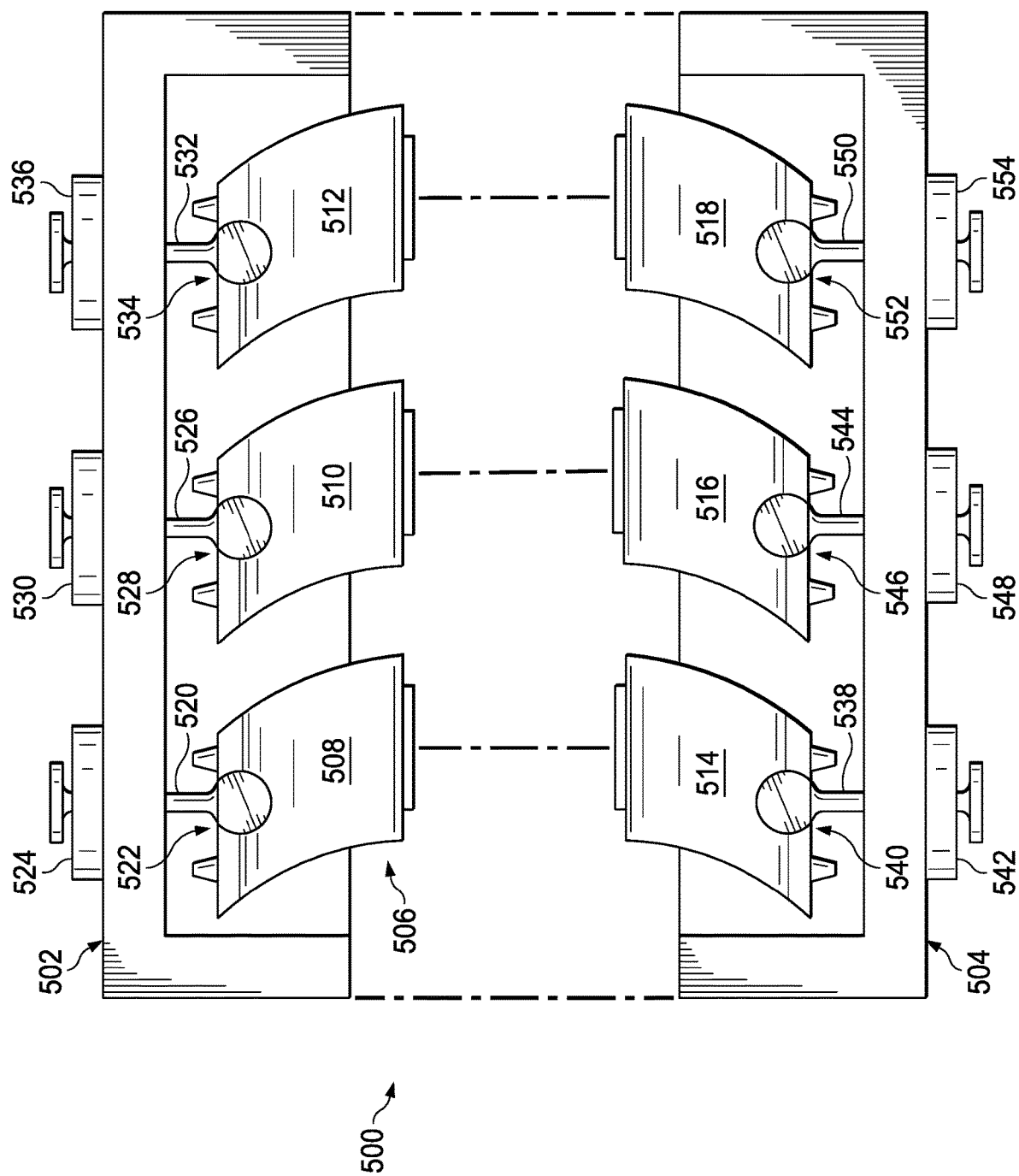
FIG. 5 is an illustration of a cross-sectional view of a molding apparatus having a plurality of articulating molding inserts in an open position in accordance with an illustrative example.

Turning now to FIG. 5, an illustration of a cross-sectional view of a molding apparatus having a plurality of articulating molding inserts in an open position is depicted in accordance with an illustrative example. Molding apparatus 500 may be a physical implementation of molding apparatus 102 of FIG. 1.

Molding apparatus 500 comprises first mold portion 502, second mold portion 504, and plurality of molding inserts 506. As depicted, each of plurality of molding inserts 506 is an articulating molding insert. First mold portion 502 may be a physical implementation of first mold portion 112 of FIG. 1. Second mold portion 504 may be a physical implementation of second mold portion 114 of FIG. 1. Each of plurality of molding inserts 506 may be a physical implementation of an articulating molding insert such as molding insert 116 or molding insert 134 in FIG. 1.

As depicted, FIG. 5 is a cut through first mold portion 502 and second mold portion 504 to see inside first mold portion 502 and second mold portion 504. By having a cross-sectional view, plurality of molding inserts 506 and the movements of plurality of molding inserts 506 are visible in FIGS. 5-12. This view may also be described as having a transparent face of first mold portion 502 and a transparent face of second mold portion 504.

Each of plurality of molding inserts 506 is associated with a respective shaft and a respective restraint. For example, plurality of molding inserts 506 includes molding insert 508, molding insert 510, molding insert 512, molding insert 514, molding insert 516, and molding insert 518.

Molding insert 508 is connected to shaft 520 by articulating joint 522. Restraint 524 is associated with shaft 520. Molding insert 510 is connected to shaft 526 by articulating joint 528. Restraint 530 is associated with shaft 526. Molding insert 512 is connected to shaft 532 by articulating joint 534. Restraint 536 is associated with shaft 532. Molding insert 514 is connected to shaft 538 by articulating joint 540. Restraint 542 is associated with shaft 538. Molding insert 516 is connected to shaft 544 by articulating joint 546. Restraint 548 is associated with shaft 544. Molding insert 518 is connected to shaft 550 by articulating joint 552. Restraint 554 is associated with shaft 550.

Shaft 520, shaft 526, and shaft 532 each extend through first mold portion 502. Shaft 538, shaft 544, and shaft 550 each extend through second mold portion 504.

As depicted, first mold portion 502 is between restraint 524 and molding insert 508. First mold portion 502 is also between restraint 530 and molding insert 510. First mold portion 502 is also between restraint 536 and molding insert 512.

Each of molding insert 508, molding insert 510, and molding insert 512 may move in at least one direction relative to first mold portion 502. As depicted, when first mold portion 502 is agitated, each of molding insert 508, molding insert 510, and molding insert 512 move relative to first mold portion 502.

As depicted, second mold portion 504 is between restraint 542 and molding insert 514. Second mold portion 504 is also between restraint 548 and molding insert 516. Second mold portion 504 is also between restraint 554 and molding insert 518.

Each of molding insert 514, molding insert 516, and molding insert 518 may move in at least one direction relative to second mold portion 504. As depicted, when second mold portion 504 is agitated, each of molding insert 514, molding insert 516, and molding insert 518 move relative to second mold portion 504.

Figure 6:
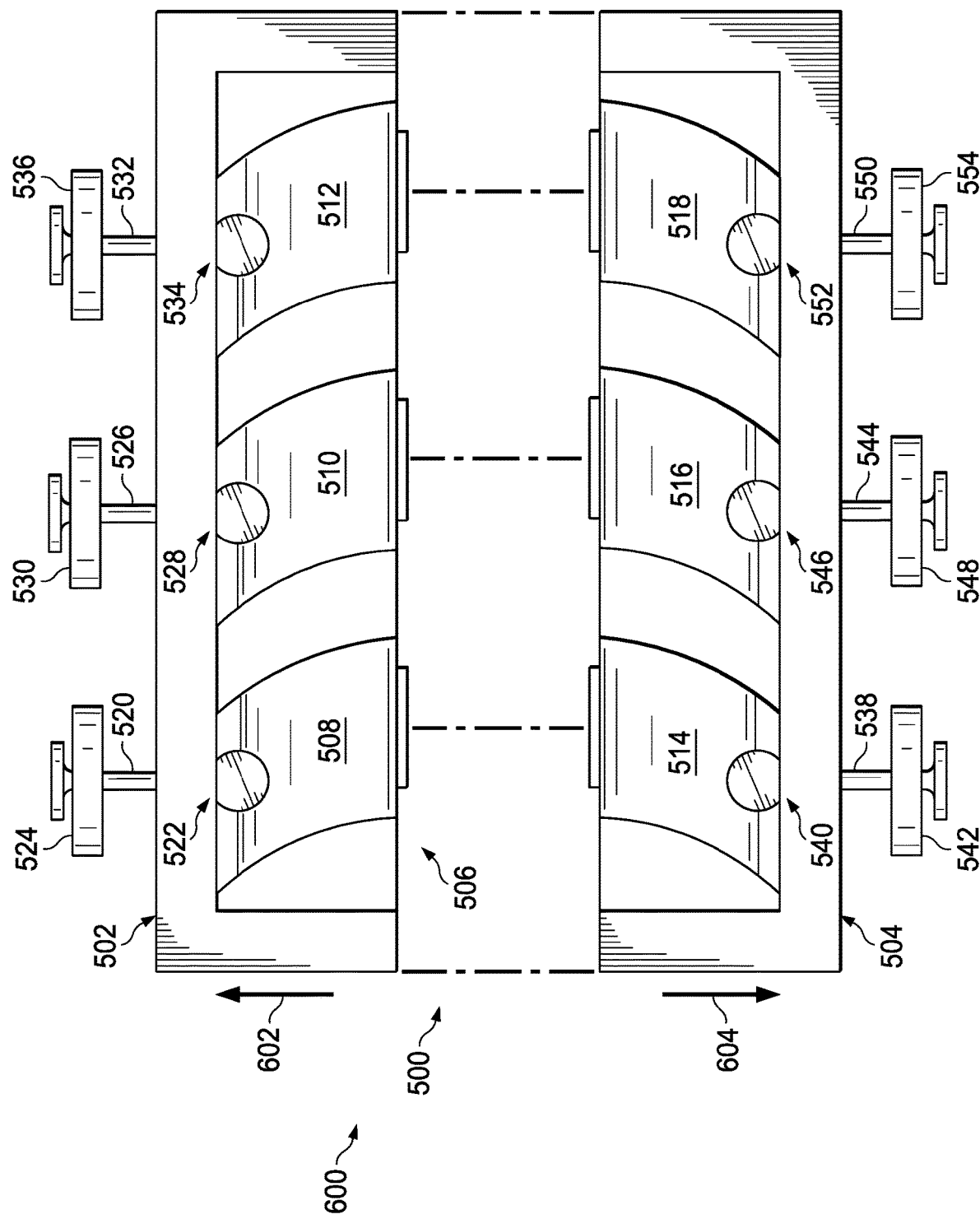
FIG. 6 is an illustration of a cross-sectional view of a molding apparatus having a plurality of articulating molding inserts in an open and aligned position in accordance with an illustrative example.

Turning now to FIG. 6, an illustration of a cross-sectional view of a molding apparatus having a plurality of articulating molding inserts in an open and aligned position is depicted in accordance with an illustrative example. View 600 is a view of molding apparatus 500 after pulling shaft 520, shaft 526, and shaft 532 away from first mold portion 502 in direction 602 and after pulling shaft 538, shaft 544, and shaft 550 away from second mold portion 504 in direction 604.

In view 600, respective alignment features of molding insert 508, molding insert 510, and molding insert 512 are associated with first mold portion 502. In view 600, molding insert 508, molding insert 510, and molding insert 512 are aligned in first mold portion 502.

In view 600, respective alignment features of molding insert 514, molding insert 516, and molding insert 518 are associated with second mold portion 504. In view 600, molding insert 514, molding insert 516, and molding insert 518 are aligned in second mold portion 504.

Figure 7:
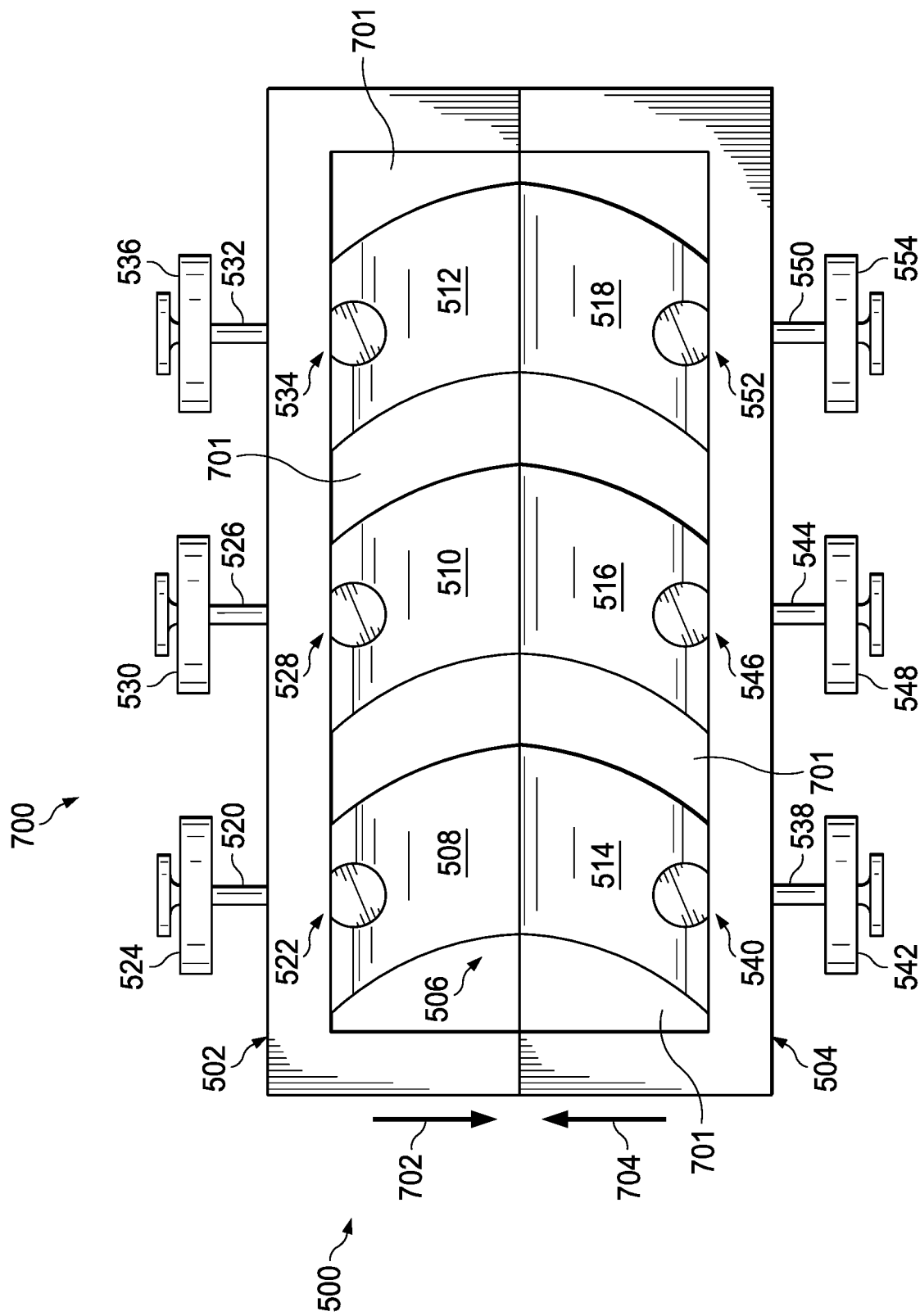
FIG. 7 is an illustration of a cross-sectional view of a molding apparatus having a plurality of articulating molding inserts in a closed and aligned position in accordance with an illustrative example.

Turning now to FIG. 7, an illustration of a cross-sectional view of a molding apparatus having a plurality of articulating molding inserts in a closed and aligned position is depicted in accordance with an illustrative example. View 700 is a view of molding apparatus 500 after moving first mold portion 502 and second mold portion 504 towards each other to form mold cavity 701. First mold portion 502 and second mold portion 504 form mold cavity 701. Plurality of molding inserts 506 is positioned within mold cavity 701.

In view 700, first mold portion 502 is moved in direction 702 towards second mold portion 504 while molding insert 508, molding insert 510, and molding insert 512 are aligned in first mold portion 502. In view 700, second mold portion 504 is moved in direction 704 towards first mold portion 502 while molding insert 514, molding insert 516, and molding insert 518 are aligned in second mold portion 504.

In view 700, molding insert 508 is aligned relative to molding insert 514. In view 700, molding insert 510 is aligned relative to molding insert 516. In view 700, molding insert 512 is aligned relative to molding insert 518.

Figure 8:
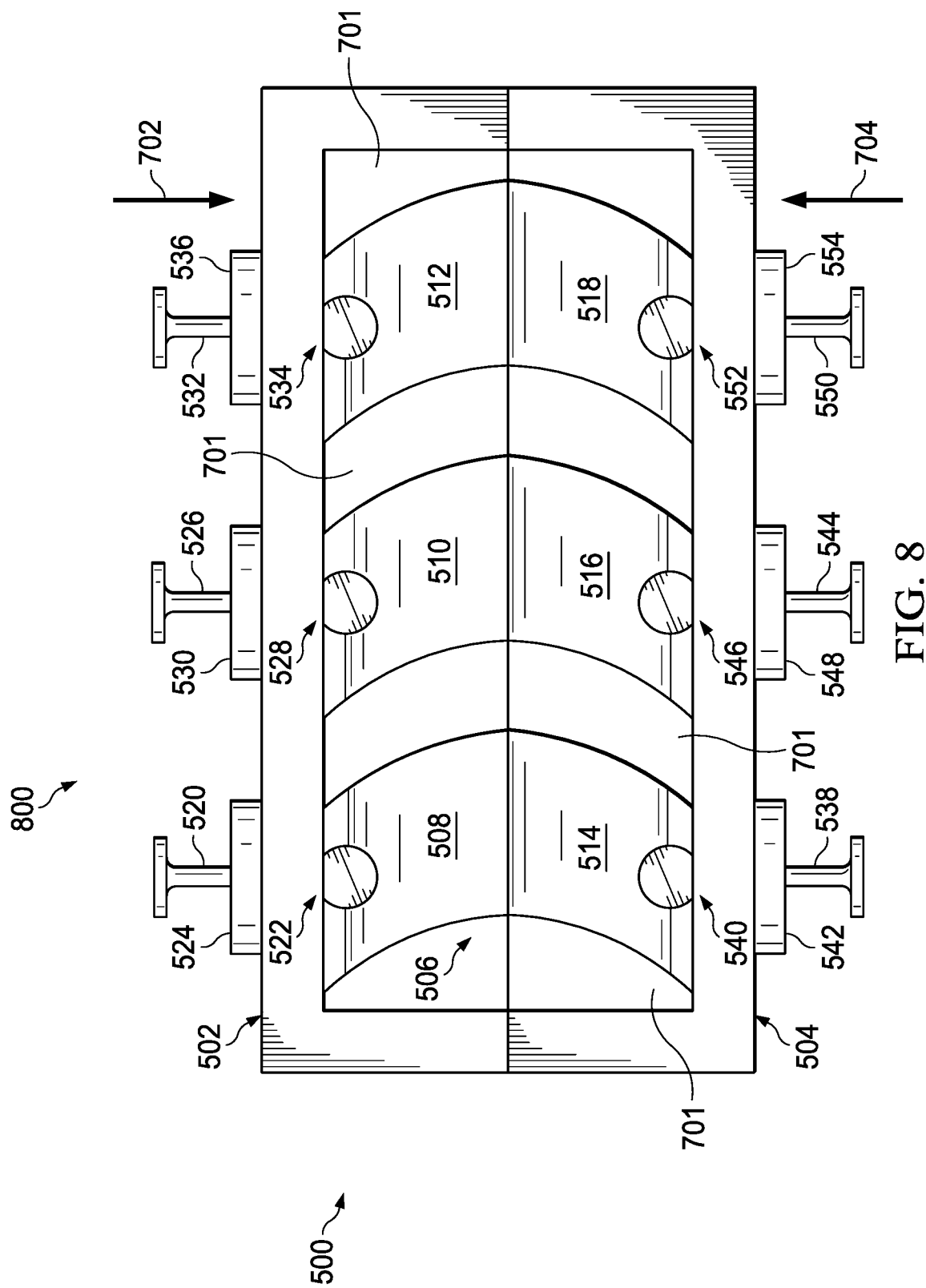
FIG. 8 is an illustration of a cross-sectional view of a molding apparatus having a plurality of articulating molding inserts in a closed, aligned, and locked position in accordance with an illustrative example.

Turning now to FIG. 8, an illustration of a cross-sectional view of a molding apparatus having a plurality of articulating molding inserts in a closed, aligned, and locked position is depicted in accordance with an illustrative example. View 800 is a view of molding apparatus 500 after locking plurality of molding inserts 506 relative to first mold portion 502 and second mold portion 504. More specifically, in view 800, restraint 524, restraint 530, and restraint 536 have been moved in direction 702 towards first mold portion 502. In view 800, restraint 542, restraint 548, and restraint 554 have been moved in direction 704 towards second mold portion 504.

By moving restraint 524, restraint 530, and restraint 536 in direction 702 towards first mold portion 502, each of molding insert 508, molding insert 510, and molding insert 512 are locked relative to first mold portion 502. By moving restraint 542, restraint 548, and restraint 554 in direction 704 towards second mold portion 504, each of molding insert 514, molding insert 516, and molding insert 518 are locked relative to second mold portion 504.

Figure 9:
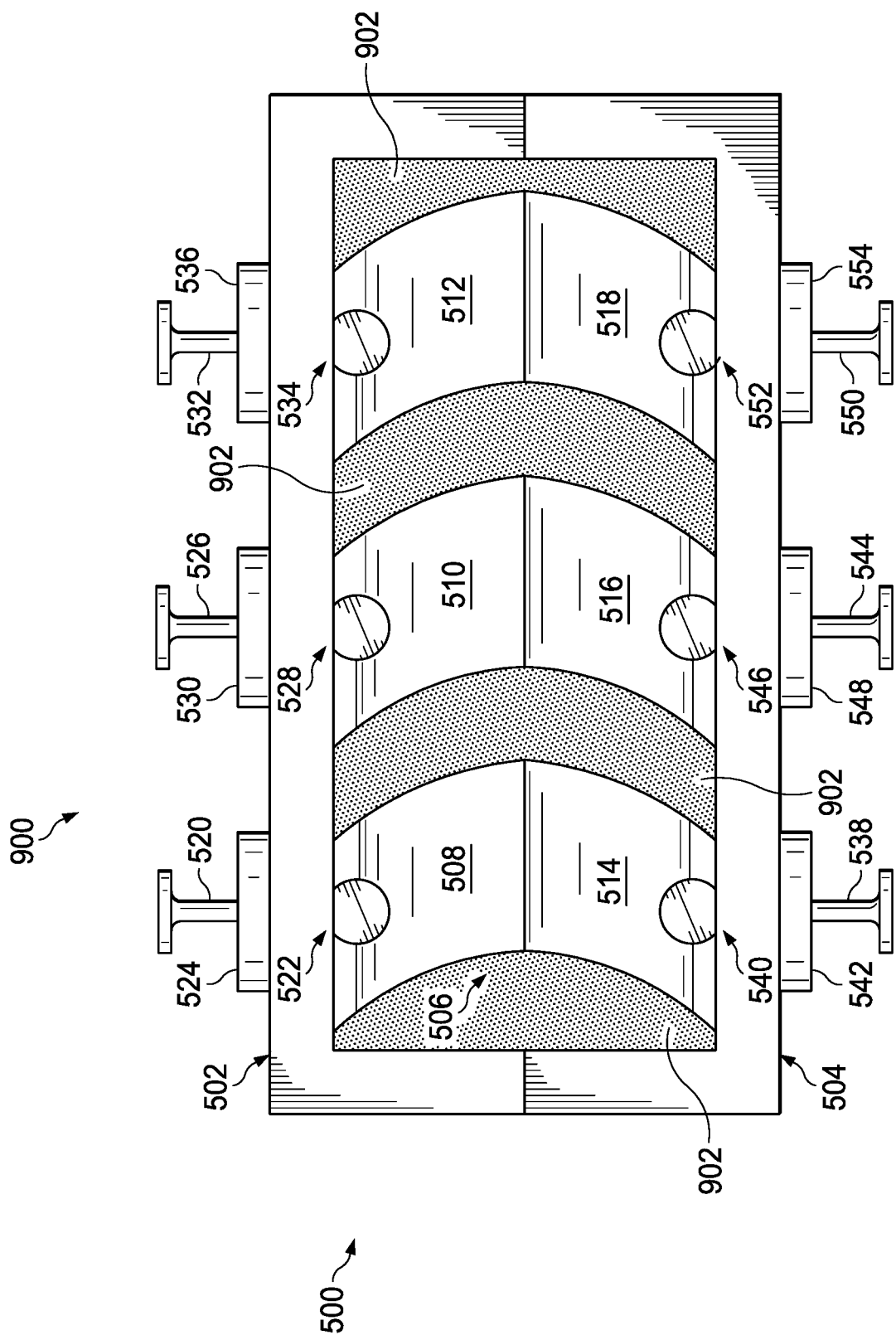
FIG. 9 is an illustration of a cross-sectional view of a molding apparatus having a plurality of articulating molding inserts after introduction of material in accordance with an illustrative example.

Turning now to FIG. 9, an illustration of a cross-sectional view of a molding apparatus having a plurality of articulating molding inserts after introduction of material is depicted in accordance with an illustrative example. In view 900, material 902 has been introduced into mold cavity 701. Material 902 fills mold cavity 701, forming around each of molding insert 508, molding insert 510, molding insert 512, molding insert 514, molding insert 516, and molding insert 518.

Figure 10:
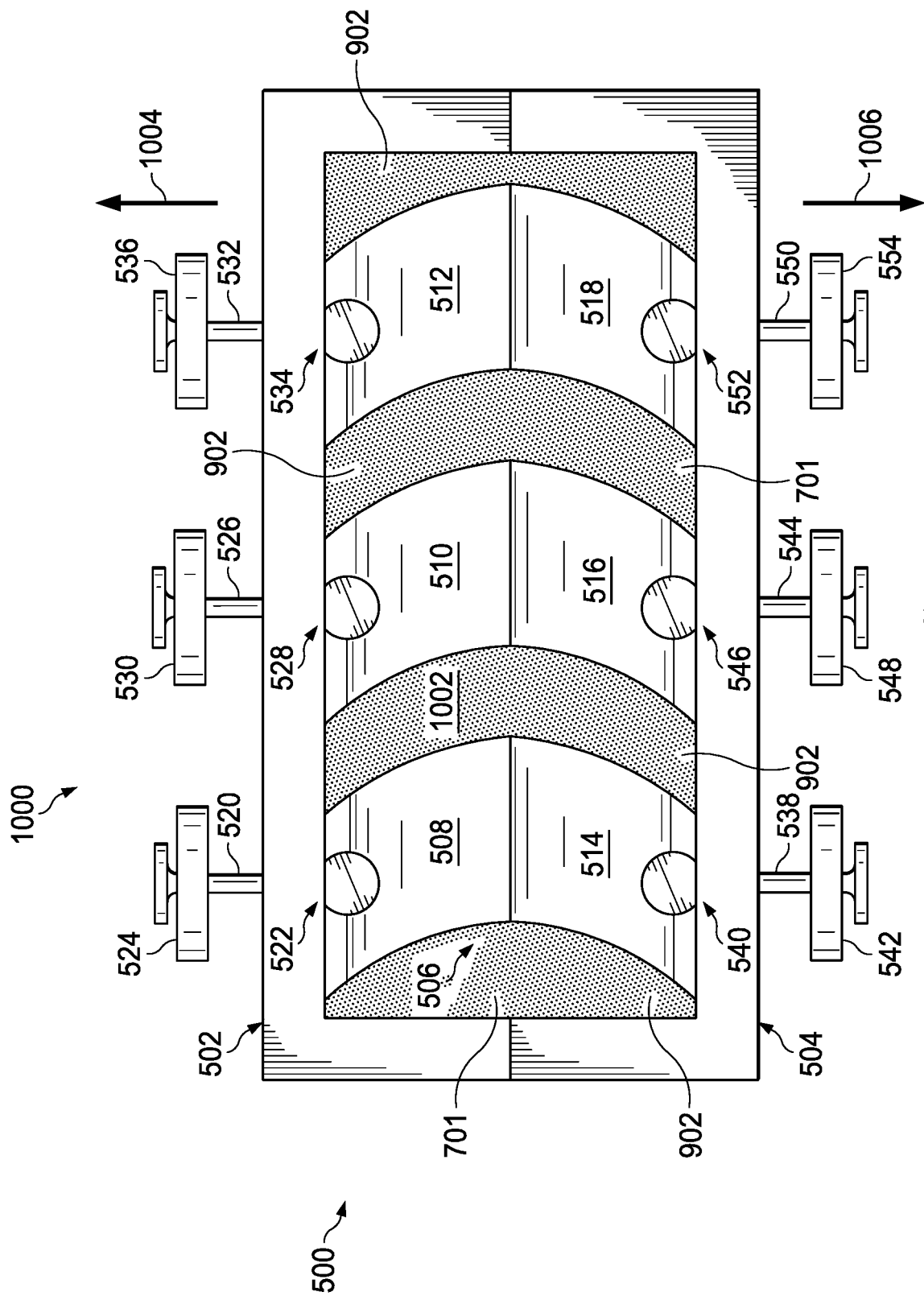
FIG. 10 is an illustration of a cross-sectional view of a molding apparatus having a plurality of articulating molding inserts with a number of parts in the mold cavity in accordance with an illustrative example.

Turning now to FIG. 10, an illustration of a cross-sectional view of a molding apparatus having a plurality of articulating molding inserts with a number of parts in the mold cavity is depicted in accordance with an illustrative example. In view 1000, number of parts 1002 formed of material 902 has been created. Number of parts 1002 may be one part or many parts. The quantity of parts created will be dependent on the shape of each of the molding inserts.

In view 1000, restraint 524, restraint 530, and restraint 536 have been moved in direction 1004 away from first mold portion 502. In view 1000, restraint 542, restraint 548, and restraint 554 have been moved in direction 1006 away from second mold portion 504.

By moving restraint 524, restraint 530, and restraint 536 in direction 1004 away from first mold portion 502, each of molding insert 508, molding insert 510, and molding insert 512 are unlocked relative to first mold portion 502. Thus, each of molding insert 508, molding insert 510, and molding insert 512 may move relative to first mold portion 502. By moving restraint 542, restraint 548, and restraint 554 in direction 1006 away from second mold portion 504, each of molding insert 514, molding insert 516, and molding insert 518 are unlocked relative to second mold portion 504.

Figure 11:
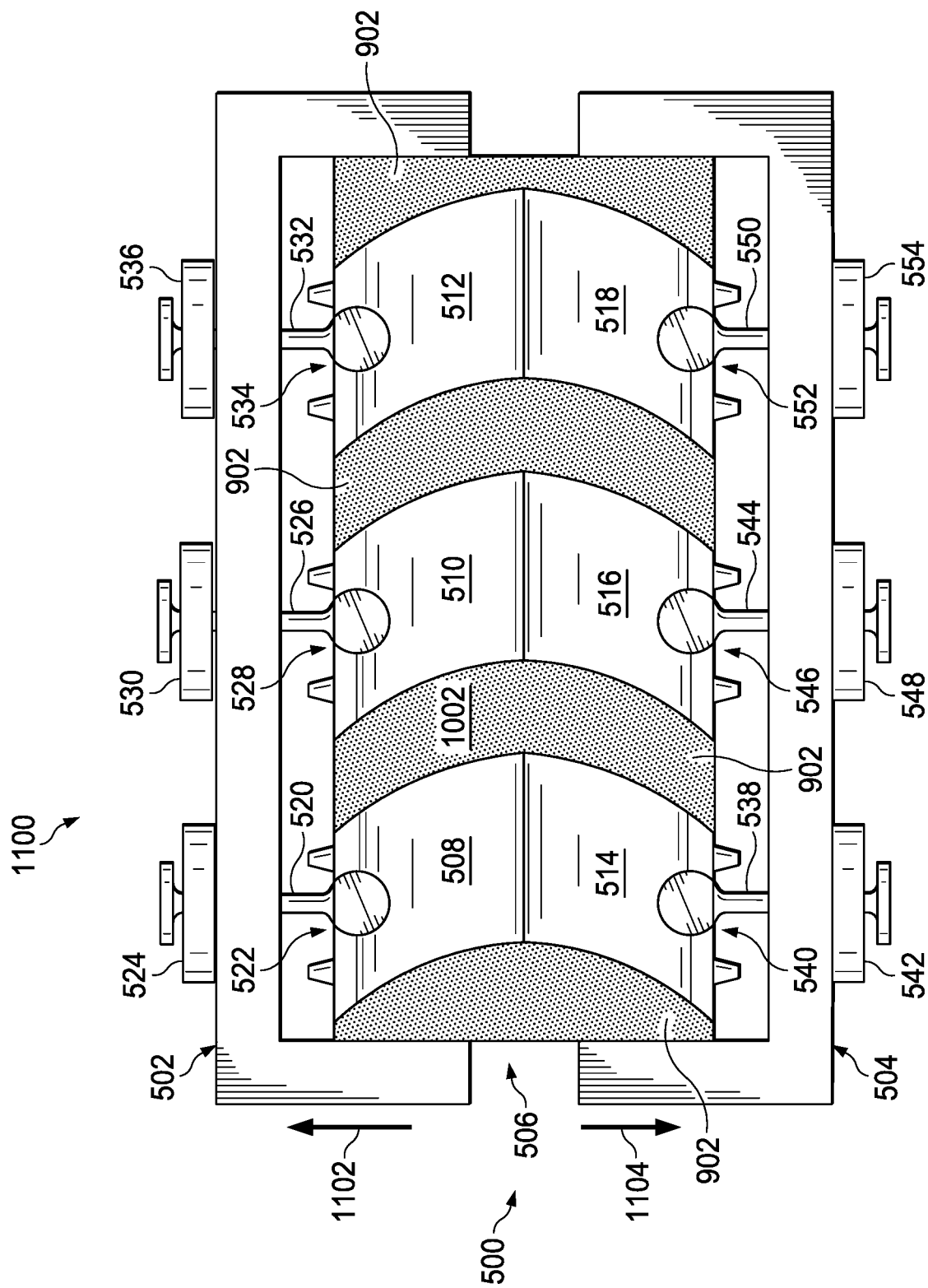
FIG. 11 is an illustration of a cross-sectional view of a molding apparatus having a plurality of articulating molding inserts as the molding portions are moved away from the number of parts in accordance with an illustrative example.

Turning now to FIG. 11, an illustration of a cross-sectional view of a molding apparatus having a plurality of articulating molding inserts as the molding portions are moved away from the number of parts is depicted in accordance with an illustrative example. In view 1100, first mold portion 502 has been moved in direction 1102 away from number of parts 1002. In view 1100, second mold portion 504 has been moved in direction 1104 away from number of parts 1002.

In view 1100, molding insert 508, molding insert 510, and molding insert 512 may be moved relative to first mold portion 502 in at least one direction. As articulating joint 522, articulating joint 528, and articulating joint 534 are all ball joints, each of molding insert 508, molding insert 510, and molding insert 512 may move in a plurality of directions relative to first mold portion 502.

In view 1100, molding insert 514, molding insert 516, and molding insert 518 may be moved relative to second mold portion 504 in at least one direction. As articulating joint 540, articulating joint 546, and articulating joint 552 are all ball joints, each of molding insert 514, molding insert 516, and molding insert 518 may move in a plurality of directions relative to second mold portion 504.

Figure 12:
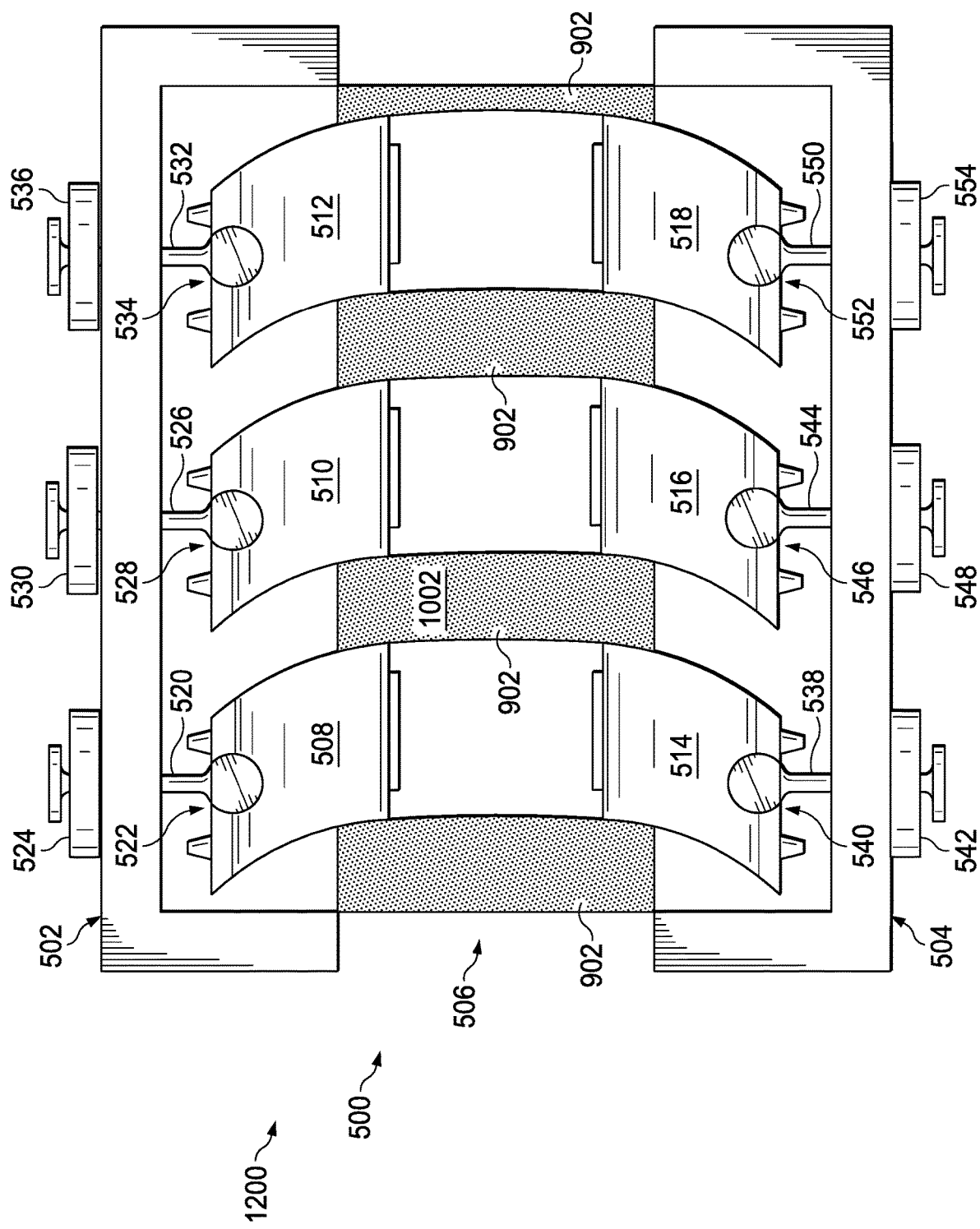
FIG. 12 is an illustration of a cross-sectional view of a molding apparatus having a plurality of articulating molding inserts as the molding inserts are removed from the number of parts in accordance with an illustrative example.

Turning now to FIG. 12, an illustration of a cross-sectional view of a molding apparatus having a plurality of articulating molding inserts as the molding inserts are removed from the number of parts is depicted in accordance with an illustrative example. In view 1200, each of molding insert 508, molding insert 510, molding insert 512, molding insert 514, molding insert 516, and molding insert 518 are agitated as first mold portion 502 and second mold portion 504 are moved away from number of parts 1002. By agitating each of plurality of molding inserts 506, they are shaken out of number of parts 1002 as first mold portion 502 and second mold portion 504 are moved away from number of parts 1002.

If plurality of molding inserts 506 were pulled straight away from number of parts 1002, plurality of molding inserts 506 would have been trapped within number of parts 1002. By shaking plurality of molding inserts 506, each respective insert may move independent of first mold portion 502 and second mold portion 504 to slide or shimmy relative to a respective feature of number of parts 1002.

Using articulating joint 522, articulating joint 528, articulating joint 534, articulating joint 540, articulating joint 546, and articulating joint 552 would reduce the amount of time spent removing plurality of molding inserts 506 from number of parts 1002. Molding apparatus 500 would not have to be disassembled to remove plurality of molding inserts 506 from number of parts 1002. Thus, disassembly and reassembly times are eliminated.

Figure 13:
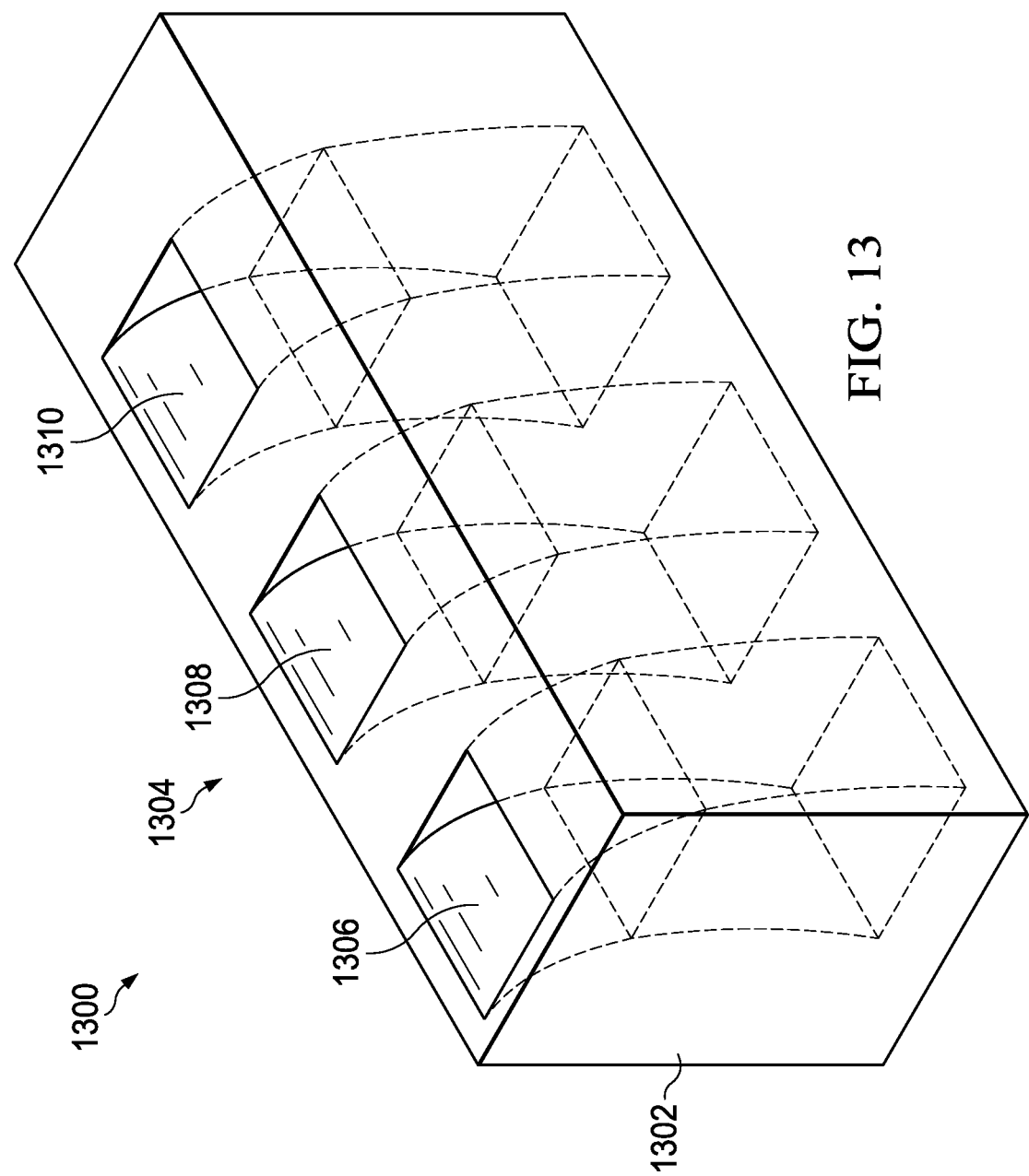
FIG. 13 is an illustration of an isometric view of a part formed using a molding apparatus having a plurality of articulating molding inserts in accordance with an illustrative example.

Turning now to FIG. 13, an illustration of an isometric view of a part formed using a molding apparatus having a plurality of articulating molding inserts is depicted in accordance with an illustrative example. In view 1300, part 1302 formed using plurality of molding inserts 506 of FIG. 5 is depicted. Part 1302 is a non-limiting example of a physical implementation of part 104 of FIG. 1. Part 104 may have any other desirable size, shape, number of cavities, number of features, size and shape of cavities, or other selected characteristics different from part 1302. Part 1302 is one physical implementation of number of parts 1002 of FIG. 10. In other illustrative examples, number of parts 1002 may be more than one part.

As depicted, part 1302 has cavities 1304 shown in phantom. Each respective cavity of cavities 1304 is formed by at least one respective molding insert of molding insert 508, molding insert 510, molding insert 512, molding insert 514, molding insert 516, and molding insert 518 shown in FIG. 5. For example, cavity 1306 is formed using molding insert 508 and molding insert 514. Cavity 1308 is formed using molding insert 510 and molding insert 516. Cavity 1310 is formed using molding insert 512 and molding insert 518.

Figure 14:
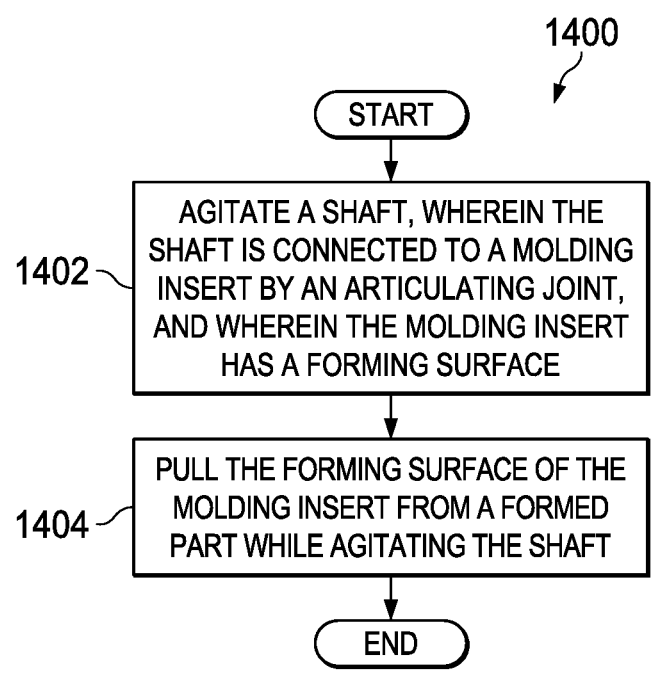
FIG. 14 is an illustration of a flowchart of a method for removing a molding insert from a formed part in accordance with an illustrative example.

Turning now to FIG. 14 is an illustration of a flowchart of a method for removing a molding insert from a formed part in accordance with an illustrative example. Method 1400 may be used to separate molding insert 116 from part 104 of FIG. 1. Method 1400 may be performed using molding apparatus 500 of FIGS. 5-12. More specifically, for example, molding insert 508 may be removed from number of parts 1002 in FIG. 12 using method 1400.

Method 1400 agitates a shaft, wherein the shaft is connected to a molding insert by an articulating joint, and wherein the molding insert has a forming surface (operation 1402). Method 1400 pulls the forming surface of the molding insert from a formed part while agitating the shaft (operation 1404). Afterwards, the process terminates.

The flowcharts and block diagrams in the different depicted examples illustrate the architecture, functionality, and operation of some possible implementations of apparatus and methods in an illustrative example. In this regard, each block in the flowcharts or block diagrams may represent a module, a segment, a function, and/or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, method 1400 may further comprise closing a first mold portion and a second mold portion to form a mold cavity containing the molding insert, wherein the shaft extends through the first mold portion. In some examples, the articulating joint is associated with a second end of the molding insert, and method 1400 further comprises aligning the molding insert relative to the first mold portion into an aligned position using an alignment feature associated with the second end of the molding insert. Method 1400 may further comprise locking the molding insert relative to the first mold portion while the molding insert is in the aligned position. Method 1400 may further comprise shaping material into a part within the mold cavity using the molding insert while the molding insert is locked relative to the first mold portion.

In some examples, method 1400 may further comprise aligning the molding insert relative to a second molding insert within the mold cavity using an alignment feature associated with a first end of the molding insert, wherein the first end is opposite the second end.

The illustrative examples provide a method and apparatus for removing molding inserts from part features having a complex curvature. The molding apparatus addresses a desire to eliminate a time intensive process involving manual removal of part inserts and manual removal of flashing material from a finished injection molded part.

By separating the tooling inserts and using a lockable ball joint mount we are able to unmold parts that contain a multiplicity of draft angles using automated processing. This tooling would enable the production of low cost parts having complex curvatures.

One illustrative example presents a method and apparatus for a high-contour cavity flow-molded composite part, comprising a first member having a first plurality of part forming cavities affixed thereto, wherein each cavity of the first plurality of part forming cavities is affixed via a ball joint having a pin and a collar; wherein the collar is adjacent a first side of the first member; wherein the ball joint is configured to enable each cavity of the first plurality of part forming cavities to move in three degrees of freedom; wherein the first cavities comprise a first and second plurality of alignment features and a tooling surface; a second member having a second plurality of part forming cavities affixed thereto, wherein each cavity of the second plurality of part forming cavities is affixed via a ball joint having a pin and a collar; wherein the collar is adjacent a first side of the second member; wherein the ball joint is configured to enable each cavity of the second plurality of part forming cavities to move in three degrees of freedom; wherein the second cavities comprise a first and second plurality of alignment features and a tooling surface; wherein the first plurality of alignment features of the first cavities correspond to the first plurality of alignment features of the second cavities; wherein the first member is configured to removably associate the first cavities with the second cavities; and wherein the first member may be configured to oscillate and/or vibrate upon disassociating the first cavities from the second cavities.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
   agitating a shaft, wherein the shaft is connected to a molding insert by an articulating joint, and wherein the molding insert has a forming surface;
   pulling the forming surface of the molding insert from a formed part while agitating the shaft;
   closing a first mold portion and a second mold portion to form a mold cavity containing the molding insert, wherein the shaft extends through the first mold portion, wherein the articulating joint is associated with a second end of the molding insert;
   aligning the molding insert relative to the first mold portion into an aligned position using an alignment feature associated with the second end of the molding insert; and
   locking the molding insert relative to the first mold portion while the molding insert is in the aligned position using a restraint, wherein the first mold portion is between the restraint and the second mold portion, wherein the first mold portion and the second mold portion are configured to move in opposite directions toward and away from each other; and wherein longitudinal axis of the shaft is parallel with the opposite directions.

2. The method of claim 1 further comprising:
   shaping material into a part within the mold cavity using the molding insert while the molding insert is locked relative to the first mold portion.

3. The method of claim 1 further comprising:
   aligning the molding insert relative to a second molding insert within the mold cavity using an alignment feature associated with a first end of the molding insert, wherein the first end is opposite the second end.

4. The method of claim 1, wherein the restraint takes the form of a locking collar.

5. The method of claim 3, wherein the alignment feature associated with the first end is one of magnetic or mechanical.

6. An apparatus comprising:
   a molding insert having a forming surface;
   a shaft connected to the molding insert by an articulating joint;
   a first mold portion;
   a second mold portion, wherein the first mold portion and the second mold portion form a mold cavity, and, wherein the molding insert is positioned within the mold cavity; and
   a restraint on the shaft, wherein the first mold portion is between the restraint and the molding insert and wherein the first mold portion and the shaft are between the restraint and the second mold portion, wherein the first mold portion and the second mold portion are configured to move in opposite directions toward and away from each other and wherein a longitudinal axis of the shaft is parallel with the opposite directions.

7. The apparatus of claim 6, wherein the articulating joint is a ball joint.

8. The apparatus of claim 6, wherein the shaft extends through the first mold portion.

9. The apparatus of claim 6, wherein the articulating joint is associated with a second end of the molding insert, and wherein the molding insert further comprises an alignment feature associated with the second end.

10. The apparatus of claim 6 wherein the forming surface has a complex contour.

11. The apparatus of claim 6, wherein the restraint takes the form of a locking collar.

12. The apparatus of claim 9 further comprising a second alignment feature associated with a first end of the molding insert, wherein the first end is opposite the second end.

13. The apparatus of claim 12, wherein the second alignment feature is configured to interact with one of the second mold portion or another molding insert.

14. The apparatus of claim 12, wherein the second alignment features is one of magnetic or mechanical.

15. A molding apparatus for forming a part having a cavity with a complex contour comprising:
   a mold cavity formed by a first mold portion and a second mold portion;
   a restraint; and
   a molding insert within the mold cavity, wherein the molding insert has a forming surface, and wherein the molding insert is configured to move in more than one direction relative to the first mold portion, wherein the molding insert is connected to a shaft by an articulating joint, wherein the first mold portion is between the restraint and the molding insert, wherein the first mold portion and the shaft are between the restraint and the second mold portion, and wherein the first mold portion and the second mold portion are configured to move in opposite directions toward and away from each other; and wherein a longitudinal axis of the shaft is parallel with the opposite directions.

16. The molding apparatus of claim 15, wherein the forming surface has a complex contour.

17. The molding apparatus of claim 15, wherein the shaft is configured to pull the molding insert towards the first mold portion.

18. The molding apparatus of claim 15, wherein the molding insert has an alignment feature configured to restrain the molding insert within the mold cavity during shaping operations.

19. The molding apparatus of claim 15, wherein the molding insert is configured to move in at least one direction in response to agitation applied to at least one of the first mold portion or the second mold portion.

20. The apparatus of claim 15, wherein the restraint takes the form of a locking collar.

\* \* \* \* \*